Figure 1:
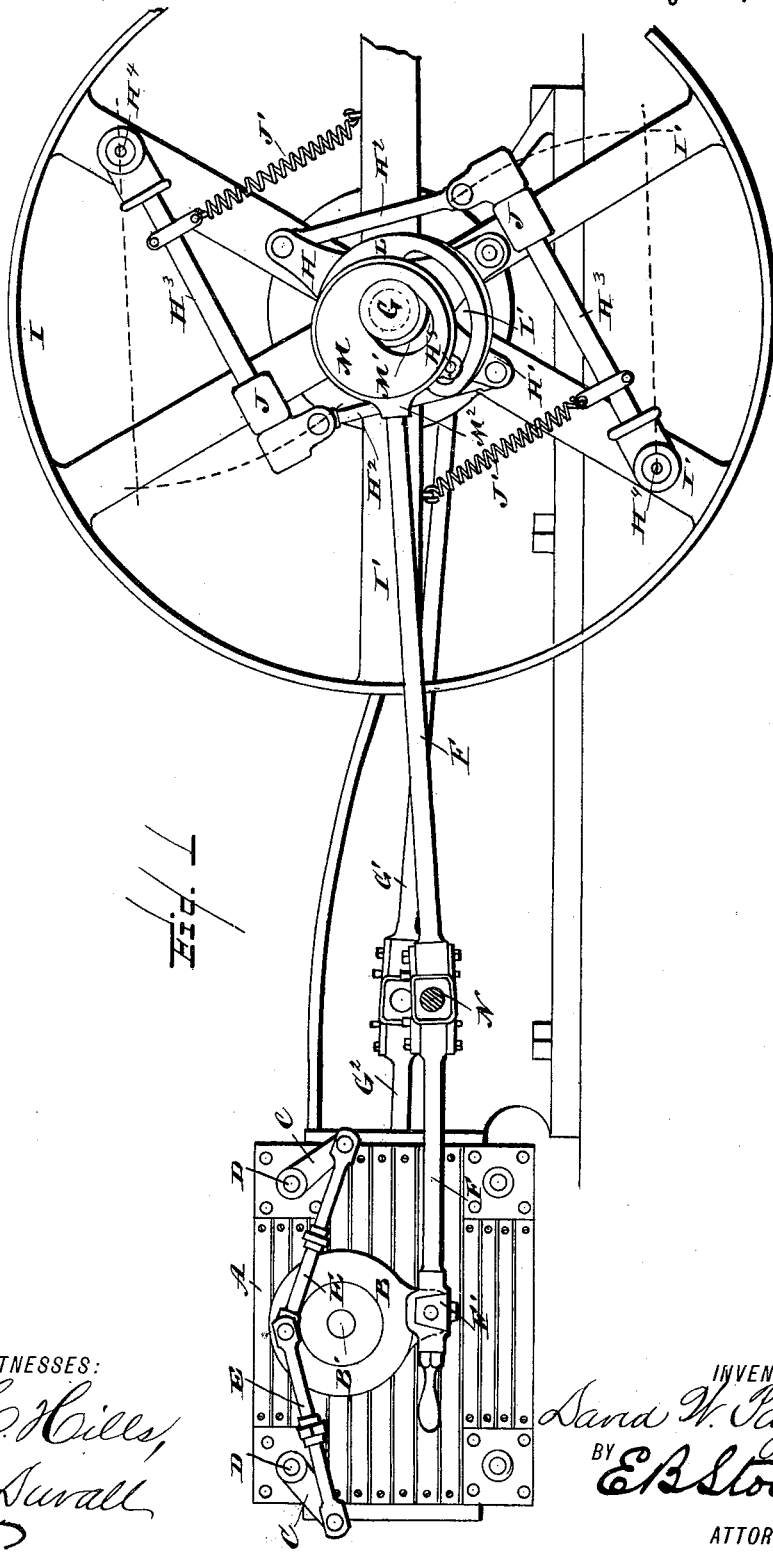

(No Model.) 4 Sheets—Sheet 1.

D. W. PAYNE.
VALVE GEAR.

No. 407,031. Patented July 16, 1889.

WITNESSES:
S. C. Hills,
W. S. Duvall

INVENTOR:
David W. Payne,
BY E. B. Stocking
ATTORNEY.

(No Model.)   4 Sheets—Sheet 2.

D. W. PAYNE.
VALVE GEAR.

No. 407,031.   Patented July 16, 1889.

WITNESSES
L. C. Hills
W. S. Duvall

Inventor:
David W. Payne
by E. B. Stocking
Atty.

(No Model.) 4 Sheets—Sheet 3.
D. W. PAYNE.
VALVE GEAR.

No. 407,031. Patented July 16, 1889.

(No Model.) 4 Sheets—Sheet 4.

D. W. PAYNE.
VALVE GEAR.

No. 407,031. Patented July 16, 1889.

WITNESSES
S. H. Hills,
W. S. Duvall.

David W. Payne,
INVENTOR
E. B. Stocking
Attorney.

UNITED STATES PATENT OFFICE.

DAVID W. PAYNE, OF ELMIRA, NEW YORK, ASSIGNOR TO B. W. PAYNE & SONS, OF SAME PLACE.

VALVE-GEAR.

SPECIFICATION forming part of Letters Patent No. 407,031, dated July 16, 1889.

Application filed August 3, 1887. Serial No. 246,059. (No model.)

*To all whom it may concern:*

Be it known that I, DAVID W. PAYNE, a citizen of the United States, residing at Elmira, in the county of Chemung, State of New York, have invented certain new and useful Improvements in Valve-Gears, of which the following is a specification, reference being had therein to the accompanying drawings.

The object of this invention is to combine a shaft or wheel-governor with the Corliss wrist-plate motion and use in the combination separate supply or cut-off and exhaust valves actuated by separate eccentrics on the main shaft, (in which case the supply-valves or cut-off would be connected to the shaft or wheel-governor.) In this case the lead, release, and compression would be fixed and only the cut-off variable, and the supply or cut-off valves would be controlled by the Corliss wrist-plate motion, which would itself be controlled by the operation of the shaft or wheel-governor. Furthermore, I may, in furtherance of the object of this invention, for simplicity place the supply-valves at the bottom of the cylinder and the cut-off valves within the main or supply valves; or I may place the cut-off valves at the top of the cylinder and the exhaust-valves at the bottom thereof, or reverse the relative positions of the valves from that just mentioned. In other words, there may be four valves—two supply and two exhaust—or there may be only two valves, each performing the functions of admission, cut off, release, and compression. In this instance I have shown rotary or oscillating valves; but it is evident that reciprocating or sliding valves may be substituted therefor. It is well known that the Corliss wrist-plate movement has a rocker mounted on an arm projecting from the cylinder or frame and actuated by an eccentric or cam. The rocker is connected by rods to cranks on the valve-stems. The connections are so placed that the motion communicated through them to the valves shall be the most rapid at times of steam admission and cutting off and slower when they are lapped or the exhaust open. By these motions quick and free admission, sharp cut-off, and free release are obtained. An arrangement for releasing the supply-valves from connection with the wrist-plate when cut off should take place is provided, and to insure a quick cut-off dash-pots or their equivalents are connected to the valves or their cranks. This construction limits the engine to a comparatively low rotative speed. Now, by combining the wrist-plate motion with the shaft or wheel-governor and dispensing with the releasing-gear and dash-pots, the engine is enabled to attain much higher rotative speed, its construction is simplified, the cost thereof reduced, and the development of much greater power from cylinders of equal diameters is accomplished.

Figure 2:
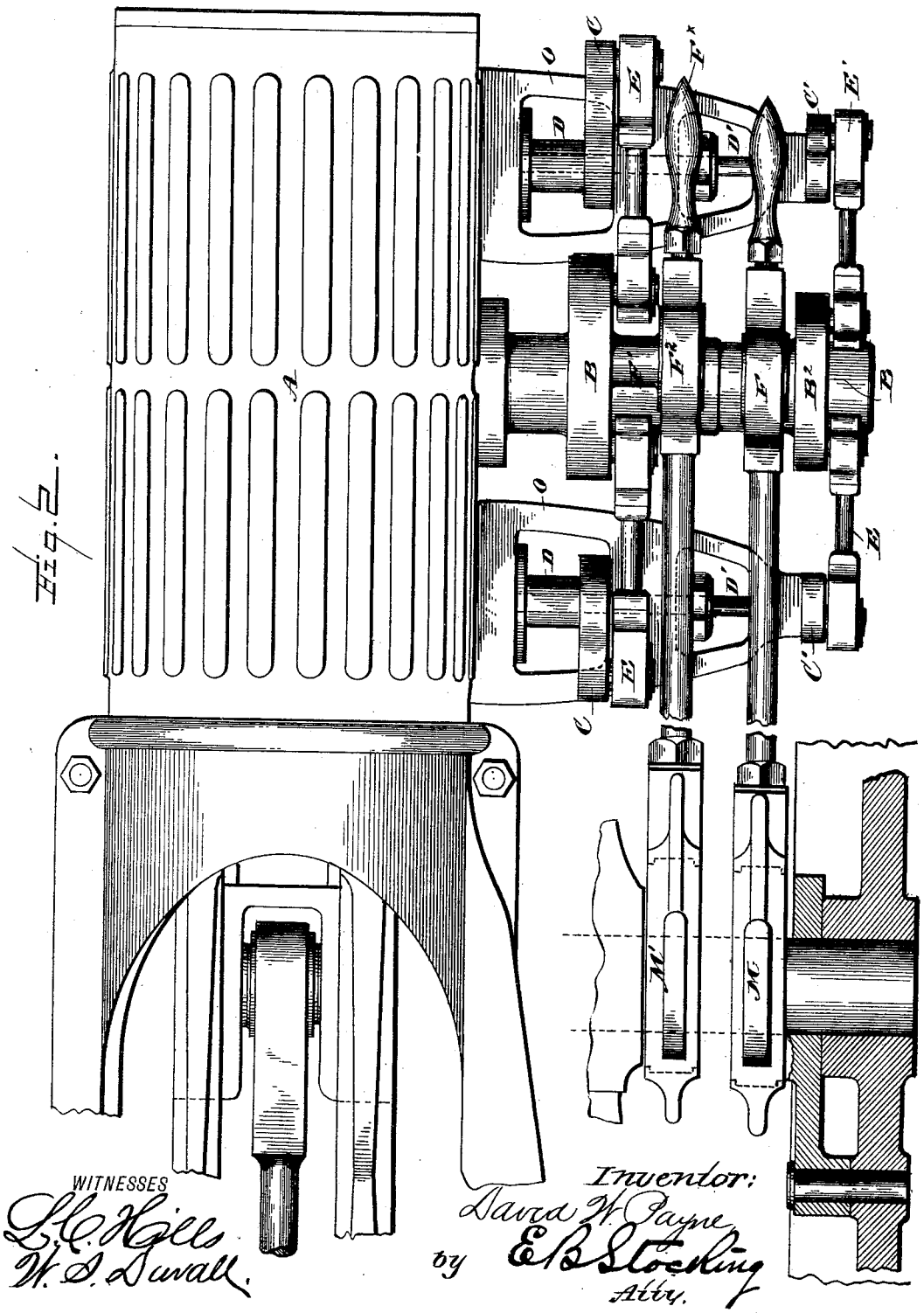
Figure 3:
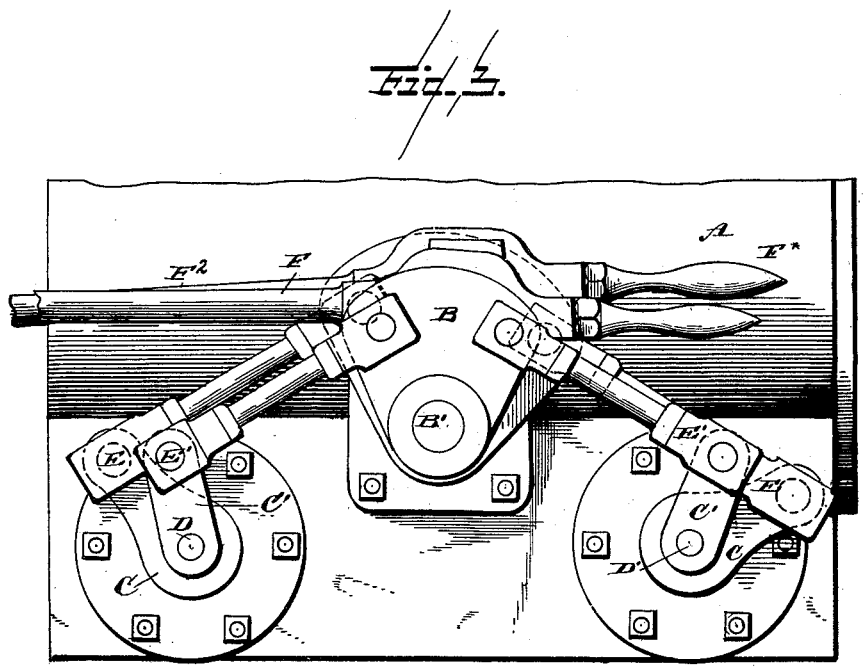
Figure 4:
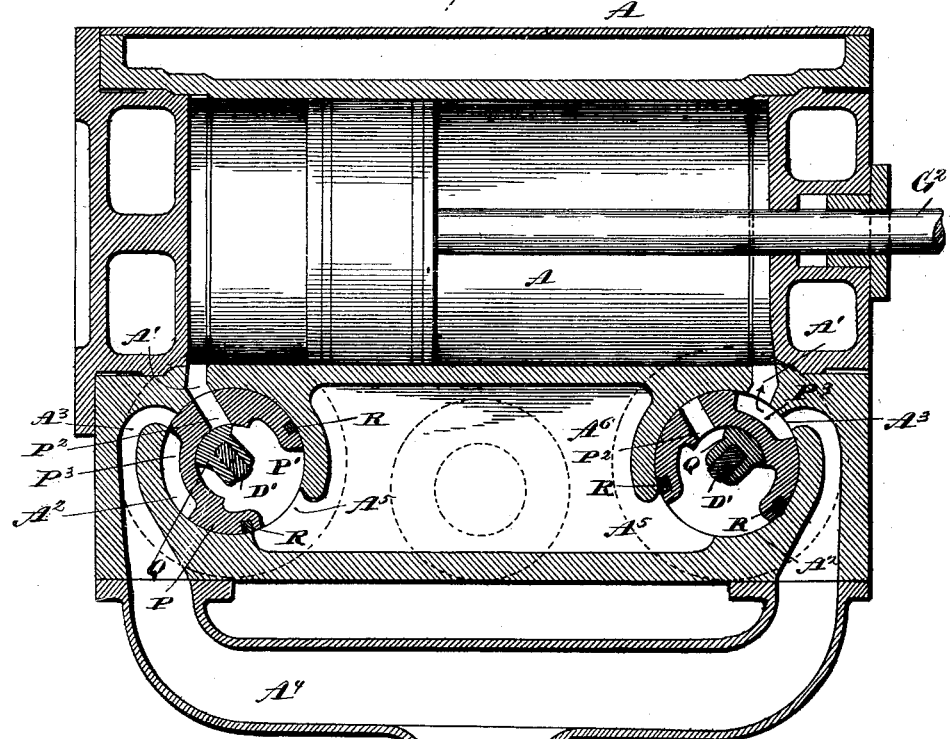
Figure 5:
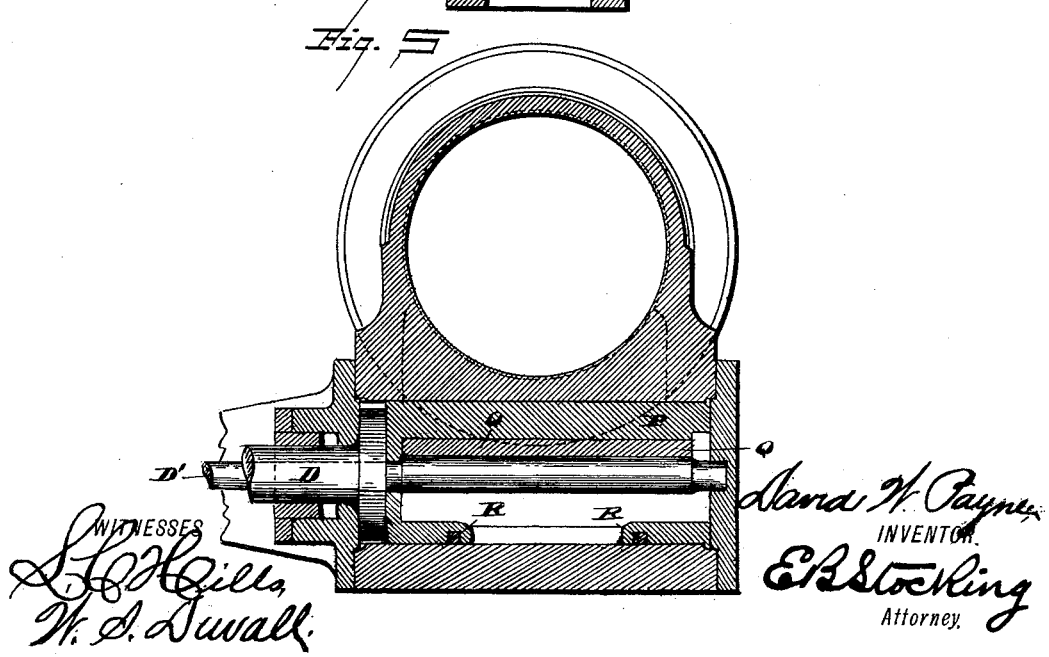

Referring to the drawings, Figure 1 is a side elevation of an engine embodying my invention. Fig. 2 is a plan of the cylinder and adjacent parts on an enlarged scale. Fig. 3 is a front elevation of a set of double rotary valves and their connections with the wrist-plates. Fig. 4 is an enlarged vertical section of the cylinder with double valves arranged at the bottom thereof. Fig. 5 is a transverse section of the cylinder, taken longitudinally through one of the double valves.

Like letters of reference indicate like parts throughout the figures of the drawings.

A represents a cylinder, projecting from which or from any suitable part of the framework is a journal or stud B', on which the wrist-plate B is mounted.

C C are cranks mounted upon the valve-stem D, and E E represent rods connecting said crank with the wrist-plate.

F represents an eccentric-rod removably connected with the wrist-plate by being recessed in the usual manner to receive and retain the rod-block or pin F', which is mounted on the wrist-plate.

G represents the main or crank shaft of the engine, to which the connecting-rod G' and piston-rod $G^2$ are connected in the usual manner. Upon the shaft are loosely mounted the arms H H', constituting a part of the shaft or wheel-governor, the outer ends of these arms being connected by a rod $H^2$ with arms $H^3$, pivoted, as at $H^4$, to the wheel I, mounted upon the shaft G.

Weights J are mounted for movement along the rods $H^3$, and springs J' are connected to the rod and to the spokes I' or other portion of the wheel I. The arm H' is provided with a pin H⁵, which may be provided with an anti-friction roller, which is projected into the curved slot L' of the eccentric-carrying plate L. The eccentric M is formed on or attached to a face of the plate L and is slotted for movement across the shaft.

In Fig. 1 is shown a particular form of shaft-governor which may be used with a single eccentric or two eccentrics. Where two eccentrics are used and the main valve performs the function of admission and the other valve that of cutting off, the governor mechanism may be attached to an eccentric on the shaft. I do not confine myself to any particular form of shaft-governor, but contemplate the use of any of the various forms desired.

Instead of the particular form of governor described, the eccentric operating the admission-valves may rotate on the shaft, thus changing the angular advance, as in the Thompson gear.

The strap M² serves to connect the eccentric-rod F with the eccentric in the usual manner.

In Fig. 1 I have illustrated a pin N, to which the eccentric-rod is connected, although it is apparent that said rod may extend directly from the wrist-plate to the eccentric, as shown in other figures of the drawings.

In Figs. 2 and 3 I have illustrated upon a larger scale the provision of double valves and the connection of each separate valve with a separate eccentric. In this instance there are extended from the side of the cylinder (and it may be either upon the top or the bottom thereof, in accordance with the desired location of the valves) brackets O, which serve as the bearing for the valve-stems D D', respectively. The cranks C of the valves D are connected to the wrist-plate B by means of rods E, and said wrist-plate is connected by means of the rod-block F' with the eccentric-rod F² in such a manner that by raising or lowering the handle F× thereof it may be connected or disconnected at will with the wrist-plate. This particular construction is simply a matter of convenience to permit of disconnecting the eccentric-rod from the wrist-plate. The connection may be made permanent or so as to disconnect at will, as desired. These exhaust-valves are actuated by a fixed eccentric M'. This eccentric is of the ordinary type and is connected to the exhaust-valves by the eccentric-rod F², as shown in Fig. 2. The end of F² fits over the pin F' on the oscillating plate B, and thence the motion is carried to the exhaust-valves by the arms E, Figs. 2 and 3. In this instance the cut-off valves are arranged within the exhaust-valves, and the stems D' of the former extend through the stem and cranks D of the latter, and are each provided with a crank C' and connected by means of rods E' to the second wrist-plate B², which is connected and operated by an eccentric-rod F and shifting eccentric M. This shifting eccentric actuates the inner cut-off valve only and enables the cut-off to be varied independently of the exhaust and compression.

In an arrangement of the valves at the bottom of the cylinder I employ the construction illustrated more particularly by Figs. 3, 4, and 5; but it will be apparent that a mere reversal of these constructions will adapt the parts for a use of the valves at the top of the cylinder. At each end of the cylinder there is a port A', communicating directly with a cylindrical valve-seat A², in the walls of which there is formed a port A³, communicating with the exhaust-passage A⁴. Another larger port A⁵ affords communication between the valve-seat and the supply-chamber A⁶, with which at any suitable point the live-steam or supply pipe may be connected, as shown by the dotted lines in Fig. 4.

The double valve consists of a hollow cylinder P, having a spindle D, and within the cylinder is arranged the inner or cut-off valve Q, having the spindle or stem D' passing through the spindle D and projecting beyond the same. The valve P has an opening P', adapted to be brought in communication with the port A⁵, and an opening P², adapted to be brought into communication with the port A'. It also has a peripheral recess P³, adapted to be brought into communication with both the ports A' and A³. The valve Q is recessed to stride the spindle D', so as to partake of its motion, and is adapted to close the port P². These constructions may be varied as desired.

As shown in Fig. 4, the supply is cut off at one side of the piston-head while the exhaust is taking place from in front of the piston. Now it will be readily seen that the variations in the load put upon the engine will affect the shaft or wheel-governor in such a manner as to vary its operation upon the eccentric M and its rod F, and that these variations will be directly communicated to the wrist-plate, and from thence through the connecting-rod to the valve-stems, so that, having once been properly adjusted in their relative movements as to time and distance, the valves are under the most direct and accurate control of the governor and readily partake of the slightest effects of the variations of the governor.

R represents strips of packing, of any suitable kind or nature, seated in the periphery of the valve Q and around the opening T' thereof, the object of which is to take the larger part of the wear or friction of the valve upon its seat and to compensate for such wear and maintain a steam-tight connection between the valve and its seat.

Having described my invention and its operation, what I claim is—

1. The combination of a fixed eccentric, a wrist-plate, and admission and exhaust valves connected with said wrist-plate with a cut-off, a wrist-plate, and a shifting eccentric directly connected with each other, substantially as described.

2. The combination, with the cylinder A, having the ports A' A³, communicating with valve-seats A², of the valves P and Q, the latter arranged within the former, valve-stems D D', connecting-rods E E', wrist-plates B and B², eccentric-rods F F², shifting eccentric M, and fixed eccentric M', substantially as specified.

In testimony whereof I affix my signature in presence of two witnesses.

DAVID W. PAYNE.

Witnesses:
HARRIS TABOR,
EDWARD C. VAN DUZER.